United States Patent [19]

Rabenau et al.

[11] Patent Number: 4,597,399
[45] Date of Patent: Jul. 1, 1986

[54] VIBRATOR ACTUATED LENS CLEANING SYSTEM

[75] Inventors: Richard Rabenau, Arab; Rowland W. Kanner, Guntersville, both of Ala.

[73] Assignee: Ryder International Corporation, Arab, Ala.

[21] Appl. No.: 682,365

[22] Filed: Dec. 17, 1984

[51] Int. Cl.⁴ ............................................ B08B 3/12
[52] U.S. Cl. .................................... 134/184; 310/21; 310/29
[58] Field of Search .................. 134/1, 184, 185, 187, 134/188, 192; 366/117, 118, 120, 122, 127, 241, 242; 310/21, 29, 32

[56] References Cited

U.S. PATENT DOCUMENTS

| | | | |
|---|---|---|---|
| 1,013,494 | 1/1912 | Hutches, Jr. | 310/21 |
| 1,925,350 | 9/1933 | Tucker | 310/29 |
| 2,442,016 | 5/1948 | Poole | 310/29 X |
| 2,543,818 | 3/1951 | Wilcox | 366/118 |
| 3,368,610 | 2/1968 | Kartluke et al. | 366/127 X |
| 3,384,354 | 5/1968 | Migule et al. | 366/118 |

FOREIGN PATENT DOCUMENTS

| | | | |
|---|---|---|---|
| 140193 | 2/1951 | Australia | 310/29 |
| 42688 | 7/1917 | Norway | 310/21 |
| 1414880 | 11/1975 | United Kingdom | 366/118 |

Primary Examiner—Philip R. Coe
Attorney, Agent, or Firm—Trexler, Bushnell & Wolters, Ltd.

[57] ABSTRACT

A contact lens cleaning system comprises a container for receiving a quantity of cleansing fluid and a contact lens therein and a vibrator including a vibration generator and a vibration transmitting assembly for transmitting vibration from the vibration generator to a predetermined portion of the container. The container includes fluid agitator components including a resilient diaphragm comprising the just-mentioned predetermined portion, which resilient diaphragm is locatable for contact with the vibration transmitting assembly so as to transmit vibration therefrom to an agitator member immersed within the cleansing fluid.

27 Claims, 6 Drawing Figures

VIBRATOR ACTUATED LENS CLEANING SYSTEM

BACKGROUND OF THE INVENTION

This invention is directed generally to the field of cleaning apparatus or systems for contact lenses and more particularly to a novel and improved vibrator actuated lens cleaning system.

With the advent of soft contact lenses and extended wear contact lenses, both of which are porous as compared to the older "hard" lenses, development of improved methods and apparatus for assuring cleaning of lenses has assumed new importance. Because of the porous nature of these types of contact lenses, as well as the relatively longer periods of wear for which certain lenses are designed, thorough cleaning is necessary to remove residue from proteinaceous and fatty body fluids and the like which have accumulated during wearing. In this regard, it will be appreciated that the relative porosity of these types of contact lenses tends to encourage collection and retention of such body contaminants. This results in a buildup of residues not only on the surfaces of the lenses but also within the pores thereof.

Such soft and extended wear lenses are generally hydrophilic, and porous as indicated above, such that the proteinacious and fatty materials tend to invade the porous matrix of the lens. For cleaning, such lenses are often subjected to an enzymatic cleaner solution of various known types and generally available. The enzymes in these cleaning solutions tend to destroy or consume the proteinacious and fatty substances which build up on the lenses after extended periods of wearing. After the lenses have been subjected to the enzyme cleaning solution, however, they must be thoroughly cleansed before placement on the eye. That is, since these enzyme solutions are hostile to bodily tissues, they would have an adverse effect if permitted to remain within the porous lens after it is replaced on the eye. In this regard, it should be recognized that the enzyme cleaning procedure generally involves leaving the lenses in the enzyme solution for a period of 6 to 12 hours so that there is often considerable penetration of the porous lenses by the enzyme solution. Accordingly, it is important that the lenses be thoroughly rinsed and any residual cleaning solution removed following the cleaning or disinfecting procedure, to assure that those materials which attack protein or protein-like substances will not remain on the lens when it is replaced in the wearer's eye.

The prior art relating to rinsing after enzyme cleaning has proposed utilizing a rotary unit that would spin the lens in a rinsing solution-filled storage case, for example as shown in U.S. Pat. No. 3,623,492. However, the constant rotation of this type of device tends to cause more agitation or swirling of the rinsing solution or water at the periphery of the case rather than at the central portion where the lens or lenses are disposed. Hence, there may be insufficient agitation of the rinsing solution or water over the entire surface of the lenses, as is necessary to effect thorough rinsing.

In general, any lens-washing container must not only contain the lens but also have sufficient open area to permit agitation of the rinsing solution or water therein. However, the solid lenses in the liquid solution tend to migrate to the area of least agitation or net liquid flow within the case. Hence, relatively thin lenses have a tendency to in effect "roll up" and migrate toward or even pass through the openings provided for liquid flow, and reach areas of minimum or no flow. This defeats the purpose of agitation, resulting in possibly insufficient rinsing and penetration of the porous lens bodies to effect complete removal of the enzyme solutions and their residues.

Additionally, with a rotary device as anticipated by the above noted prior art require some form of seal where the rotary shaft or other rotation imparting member passes through or into the container. Providing a reliable seal between relatively rotating parts always presents problems in design and fabrication. Moreover, rotating parts tend to experience wear while in service, necessitating repair or replacement or possibly leading to unsatisfactory operation or even failure. Also, it is noted that the device shown in the above-referenced U.S. Pat. No. 3,623,492 is a manually operated device. Hence, there is some problem of possible user fatigue or simply failure of the user to operate the device for a sufficient length of time or with sufficiently vigorous action to obtain the desired rinsing or cleaning action.

OBJECTS AND SUMMARY OF THE INVENTION

Accordingly it is a general object of the invention to provide a novel and improved lens cleaning system including a novel and improved system for rinsing cleaning fluids from porous contact lenses.

A more specific object is to provide an improved system in accordance with the foregoing object wherein the rinsing solution or fluid is agitated with respect to the lenses during the rinsing operation, while avoiding the foregoing problems.

Yet a more specific object is to provide a vibrator actuated lens cleaning system in accordance with the foregoing objects.

A related object is to provide a lens cleaning system in accordance with the foregoing objects which is relatively simple and inexpensive in its design and construction and yet highly reliable in operation.

Briefly, and in accordance with the foregoing objects, a lens cleaning system comprises container means for receiving a quantity of fluid and a contact lens therein; vibrator means including vibration generating means and vibration transmitting means for transmitting vibration from said vibration generating means to a predetermined portion of said container means; and fluid agitator means including resilient means comprising said predetermined portion of the container and locatable for contact by said vibration transmitting means so as to further transmit vibration to said liquid.

BRIEF DESCRIPTION OF THE DRAWINGS

The organization and manner of operation of the invention, together with further objects and advantages thereof, may best be understood by reference to the following description taken in connection with the accompanying drawings in the several figures of which like reference numerals identify like elements, and in which.

DETAILED DESCRIPTION OF THE ILLUSTRATED EMBODIMENT

Figure 1:
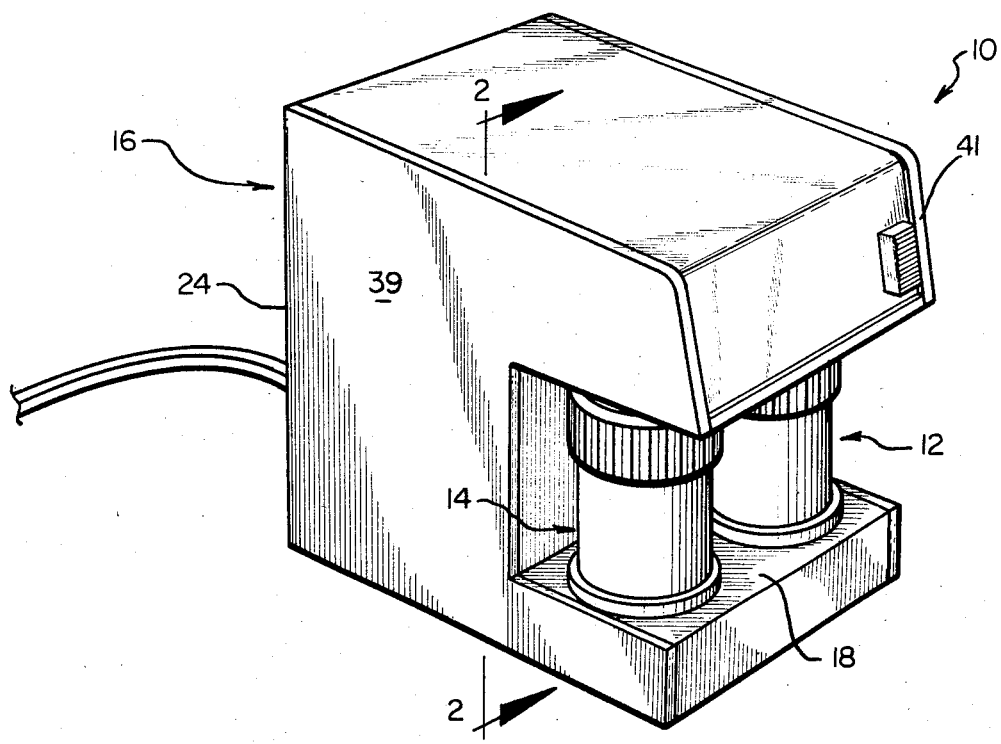
FIG. 1 is a perspective view of a vibrator actuated lens cleaning system in accordance with the invention.
Figure 2:
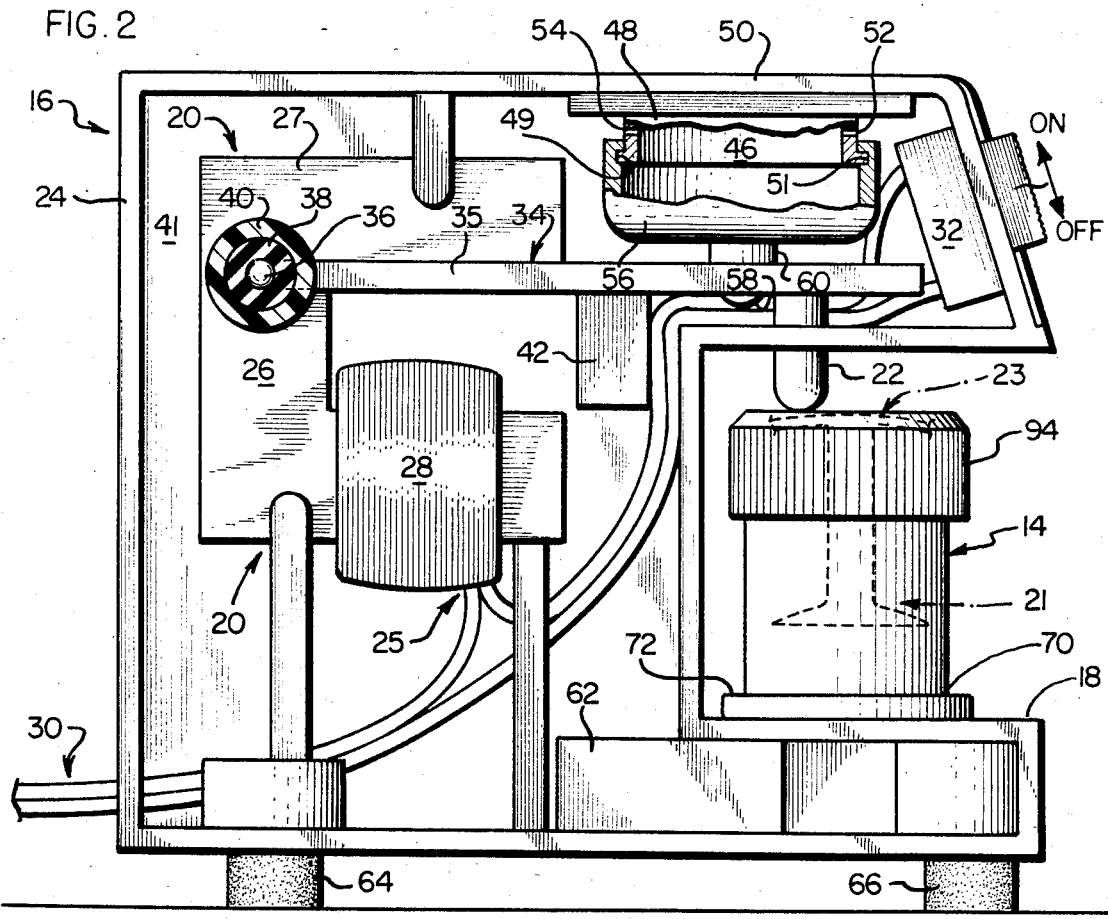
FIG. 2 is an enlarged side elevational view of the system of FIG. 1, with a side wall of the vibrator unit removed and taken generally along the line 2—2 of FIG. 1.

Referring now to the drawings and initially to FIGS. 1 and 2, a contact lens cleaning system in accordance with the invention is designated generally by the reference numeral 10. The system 10 includes a pair of containers or container means 12, 14, each for receiving a quantity of fluid and one of a pair of contact lens therein. These containers 12 and 14 are substantially identical, whereby only one such container will be described in detail herein.

The system 10 also includes a vibrator assembly or vibrator means designated generally by reference numeral 16 which includes a platform portion 18 for receiving the containers 12, 14. The vibrator assembly 16 also includes vibration generating means, designated generally 20, and vibration transmitting means 22 for applying vibration from the vibration generating means to a predetermined portion of the respective containers 12 and 14.

Moreover, the respective containers 12 and 14 include internal fluid agitator means indicated generally by reference numeral 21, to be described later, for agitating the fluid therein. This agitator means also includes resilient means, indicated generally by reference numeral 23, through which vibrational forces are transmitted to the fluid within the containers 12 and 14. As such, this resilient means 23 is positioned for contact with the vibration transmitting means 22 and for transmitting vibration to the agitator 23.

Referring now to FIG. 2, the vibrator assembly 16 will be considered in detail. In this regard, it will be seen that the vibrator assembly 16 includes a housing 24, with the vibration generating means 20 and vibration transmitting means 22 located within said housing 24. In the illustrated embodiment, the vibration generating means 20 comprises an electromagnet 25 including a U-shaped core 26 and a coil 28 wrapped around one leg of the core 26. The electromagnet 25 is alternating current-driven. To this end, alternating current is provided to the coil 28 from a suitable source of alternating current power through a two-conductor electric cord 30 by way of a power on/off control switch 32.

The vibration generating means 20 further includes an elongate yoke member or yoke means 34 which is pivotally mounted to the housing 24 by a pivot arm 36 formed at one end of yoke 34. In the illustrated embodiment, the opposite ends of the pivot arm 36 are engaged in resilient or rubber-like cylindrical bushings 38 which are in turn mounted within fixed sleeve members 40 formed as integral parts of the outer side walls 39, 41 of the housing 24. In the drawings, only one such mounting arrangement and side wall 41 are shown, it is to be understood that a similar mounting arrangement for the yoke 34 is provided on the opposite side wall 39. As such, the yoke member 34 is generally Y-shaped, embracing the upper portion 27 of core 26 of the electromagnet 25. The Y-shaped yoke member 34 has a first leg 35 from which pivot arm 36 projects and an opposite leg (not shown) having a second pivot arm or shaft, similar to arm or shaft 36, pivotally mounted within bushings and mounting sleeve similar to sleeves 38 and 40 on the opposite side wall of the housing 20 (not shown in FIG. 2).

The vibration generating means also includes ferromagnetic means here taking the form of a generally rectilinear ferromagnetic member 42. This member 42 is carried by the yoke 34 and disposed in the field of the electromagnet 25 thereby causing oscillation of the yoke 34 about its pivot 36 in response to the alternating magnetic field. In the illustrated embodiment, it will be seen that the ferromagnetic member 42 is mounted to an underside of yoke 34 and is approximately aligned with the open face of the U-shaped core 26. Moreover, this member 42 is mounted approximately midway along the length of the yoke member 34 between pivot 36 and vibration transmitting means 22. In this regard, the vibration transmitting means 22 comprises a pair of projecting members located near an end of yoke 34 opposite pivot 36, only one of said members 22 being shown in FIG. 2. These members 22 project or protrude outwardly of the housing 24 for contact with the previously mentioned resilient means 23 of containers 12 and 14.

A pneumatic oscillation damping means designated generally by reference numeral 46 is also provided for controlling or damping the oscillation of the yoke 34. This damping means comprises a chamber defined in part by an open ended cylindrical portion 48 which depends downwardly from a top surface 50 of the housing 20. This downwardly depending cylindrical portion 48 has one or more through orifices 52, 54. The chamber 46 is further defined by a resilient cap-shaped or cap-like member 56 of a rubber-like material which is engaged over the open end of said cylindrical portion and has an annular groove 49 which receives an annular radially outwardly projecting rim 51 of said cylindrical portion 48. The cap-like member 56 also is coupled with the yoke 34 intermediate the ferromagnetic member 42 and projecting member 22. In this regard, fastener means 58 and a spacer 60 are utilized to interconnect a mid-portion of the cap-like member 56 with yoke 34.

From the foregoing, it will be appreciated that the chamber 46 formed by cup-like member 56 and cylindrical portion 48 form a pneumatic damping chamber, wherein the ingress and egress of air and hence damping effect of the chamber is controlled by the selection of the size and/or number of "control" orifices 52, 54. Additional vibration damping is provided in the form of a vibration damping mass 62 mounted in the housing, which may be a relatively heavy or massive member, and is preferably located at a bottom portion of the housing and near the platform portion 18. Vibration damping feet 64, 66 are also utilized, preferably constructed from a rubber-like material. In this regard, the resilient sleeve or bushing 38 may also act in part as a vibration damper for controlling the vibrations in yoke 34.

Figure 3:
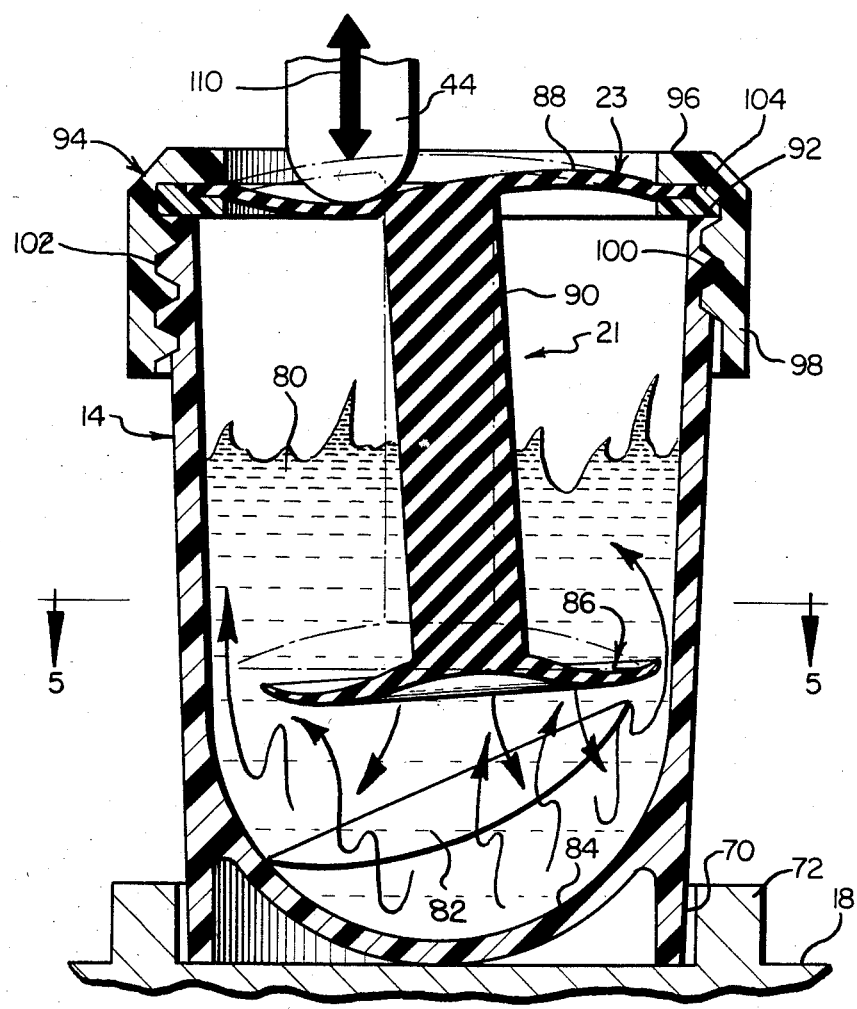
FIG. 3 is a further enlarged side elevation, partially in section, of a container in accordance with the invention.

Attention is now directed to FIG. 3 wherein the containers 12 and 14 will be discussed. As said containers are of identical construction, only container 14 is illustrated and described hereinafter. It will be noted that the container 14 is generally circular in cross-section, and includes a circular base portion 70. The vibrator assembly 16 includes locating or container receiving means in the form of a raised circular rim 72 on platform 18 for surroundingly engaging the circular base 70 and thereby receiving and locating the container 14 on platform 18. Preferably, the raised circular rim 72 locates the container 14 to be in off-center alignment with the protruding vibration transmitting member 22. This off-center engagement and the effects thereof will be more fully described later. Hence, the protruding member 22 generally overhangs the platform 18 and is also offset from center with respect to the locating rim 72 to thereby engage a selected portion of the container at a location offset from the center thereof.

Referring still to FIG. 3, the container 14, as previously mentioned, comprises a cylindrical, body for containing a quantity of fluid 80 and a contact lens 82 therein, said fluid 80 preferably comprising a saline solution for cleansing the lenses of the enzymatic cleaner. In the illustrated embodiment the container 14 has a generally semi-spherical inner bottom surface 84 for facilitating removal of the lens 82 from said container 14. However, the bottom of the container may have other shapes or configurations without departing from the spirit and scope of the invention.

The previously mentioned fluid agitator means 21 includes an agitating member 86 for producing turbulance or agitation of the fluid in the container. In addition, the agitator means 21 also includes a resilient diaphragm 88 connected to member 86 by an elongate stem portion 90, which diaphragm 88 comprises the previously mentioned resilient means 23, of fluid agitator means 21, and receives the vibrations from the vibration transmitting member 22. This resilient means or diaphragm 88 is generally circular and preferably convex and is located or disposed at a top portion of the container 14 for this purpose.

Figures 5, 6:
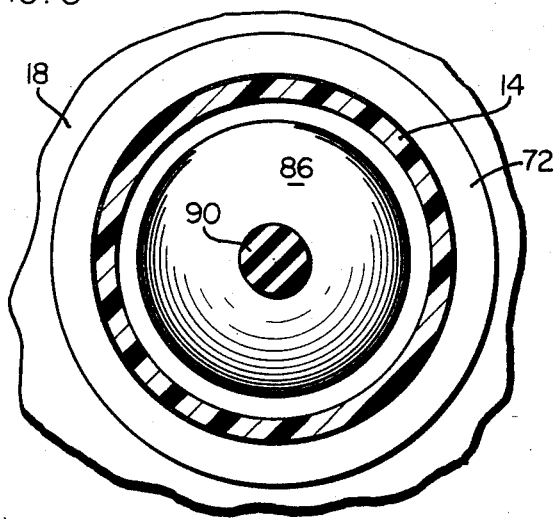
FIG. 5 is a sectional view taken generally along the line 5—5 of FIG. 3.
FIG. 6 is a sectional view similar to FIG. 5 and illustrating a modified form of a portion of an agitator member in accordance with the invention.

In the embodiment illustrated in FIGS. 3 and 5, the agitating member 86 will be seen to be generally circular and preferably convex in form. This agitating member 86 is also preferably of a resilient material so as to generally flex about the periphery thereof as it is moved with respect to fluid 80, to thereby encourage greater turbulance and agitation of the fluid 80. Preferably, the circular diaphragm 88, the stem portion 90 and the agitating member 86 are integrally formed from a resilient material.

The container 14, in the embodiment illustrated in FIG. 3, includes an annular upper rim portion 92 and an external cap 94 having a generally annular radially extending rim 96 and an axially depending skirt 98. This depending skirt 98 is threaded as indicated generally at 100 for threadable engagement with complementary threads 102 formed on the upper outer surface portion of the container 14. An additional annular, and preferably stepped, sealing ring 104 is also interposed intermediate the upper rim 92 of container 14 and the lower surface of the circular diaphragm 88 to assure sealing when the cap 94 is threadably advanced relative to the container. As can be seen the circular diaphragm 88 extends radially so that an outer peripheral edge thereof is disposed within an annular relieved portion of the seal ring 104. The seal ring 104 and the peripheral edge of the diaphragm are disposed in the area between the upper rim 92 of container 14 and the annular rim 96 of the cap 94, such that the periphery of said diaphragm 88 and 104 are sealingly engaged therebetween. Hence, the diaphragm 88 generally defines a resilient central top closure portion for the container 14, the diaphragm being also thereby positioned to be contacted by the vibration transmitting member 22.

Additionally, as shown in phantom line in FIG. 3, both the agitating member 86 and diaphragm 88 are convex as previously mentioned. In this regard, both of these members 86 and 88 have similar generally upward convex curvatures, that is, a convexity in the direction facing vibration transmitting member 22 and in the direction of the top portion of the container 14. As previously indicated, this vibration transmitting member 22 is an elongate member, and is advantageously located for engagement with an off-center portion of the circular diaphragm 88 so as to transmit both vertical and lateral vibrational force components to the agitating member 86. This location is accomplished by the previously described locating rim 72. It will be noted that the undeformed position of diaphragm 88, shaft 90 and agitating member 86 is shown in phantom line in FIG. 3, while a deformed state thereof in response to movement of the vibration transmitting member 22 in a downward direction is illustrated in solid line.

In this regard, it will be appreciated from description of the vibrator apparatus 16 of FIG. 2 that the vibrational forces experienced in the vibration transmitting member 22 are primarily vertically upwardly and downwardly as indicated by arrow 110 in FIG. 3. Since the member 22 strikes the diaphragm 88 off-center, an additional amount of lateral movement will be transmitted and amplified by shaft 90 to result in the addition of a lateral component to the vertical motion of agitator 86. Hence, the cleansing fluid 80 is thoroughly agitated by the movement of agitating member 86 which in addition, to both vertical and lateral movement, also experiences flexing during vibration as previously indicated and as shown in FIG. 3. The agitation and turbulance created in the fluid 80 serves to cleanse the lens 82 thoroughly of any residual enzymatic cleaners that may have remained in the porous lens stucture.

Referring briefly to FIGS. 5 and 6, in FIG. 5 the agitating member 86 of FIG. 3 will be seen to be of generally circular cross-section and having an outer diameter less than the cross-section inner diameter of the container 14 in the region of the agitating member. FIG. 6 illustrates a modified form of the agitating member, designated by reference numeral 86a. This latter agitating member 86a also has a diameter smaller than the adjacent cross-sectional diameter of container 14. However, agitating member 86a further includes a plurality of spaced apart radially outwardly extending fingers or projections 112 which describe an outer diameter substantially similar to the adjacent inner diameter of the container 14. Hence, the outwardly extending fingers 112 tend to engage the inner peripheral wall surface of the container during vibration of the agitating member, and serve to prevent a lens from moving upwardly above the agitator member 86a.

Figure 4:
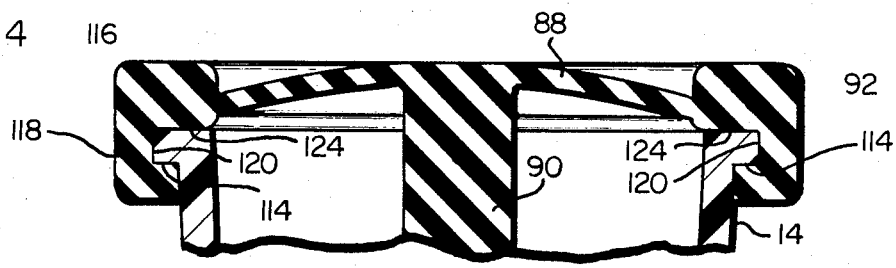
FIG. 4 is a partial side elevation similar to FIG. 3 illustrating an alternate embodiment of a container in accordance with the invention.

Referring now to FIG. 4, an alternative form of the upper portion of the agitator means about the area of resilient means or diaphragm 88 is illustrated. In this embodiment the agitator means, diaphragm and cap are formed as a unitary member. More specifically, this alternative form generally includes a portion for engaging the upper rim portion 92 of the container 14 to act as a cap, thus permitting the separate cap member 94 of FIG. 3 to be eliminated. In the embodiment illustrated in FIG. 4, the top rim portion 92 of the container includes a generally annular, radially outwardly extending lip portion 114. The resilient means or diaphragm 88 has an additional, integrally formed, radially outwardly extending sealing portion designated generally by reference numeral 116. This sealing portion 116 includes a downwardly depending skirt 118 having an annular recess 120 therein. This annular recess 120 is formed for complementary sealing engagement with the lip 114 of the top rim of the container. Hence, in the embodiment of FIG. 4, the agitating member 86 (not shown in FIG. 4) shaft member 90, diaphragm 88 and sealing portion 116 are integrally formed from a resilient material.

Additionally, it will be seen in FIG. 4 that the sealing portion 116 includes an additional abutment portion 124 which extends generally inwardly from the annular recess 120 and is positioned and dimensioned for engagement with the upper rim 92 of the container to enhance the sealing engagement provided as just described. Accordingly, the container 14 and agitator means or assembly as configured in FIG. 4 eliminates the need for an additional cap member 94 and for threads 102 on the container, as well as for sealing ring 104. In this regard, the flexible and resilient nature of the material of the sealing portion 116 of diaphragm 88 permits relatively simple engagement with container 14 for sealing, and later disengagement therefrom for removing the contact lens 82 and fluid 80.

While particular embodiments of the invention have been shown and described in detail, it will be obvious to those skilled in the art that changes and modifications of the present invention, in its various aspects may be made without departing from the invention in its broader aspects, some of which changes and modifications being matters of routine engineering or design, and others being apparent only after study. As such, the scope of the invention should not be limited by the particular embodiments and specific constructions described herein but should be defined by the appended claims and equivalents thereof. Accordingly, the aim in the appended claims is to cover all such changes and modifications as fall within the true spirit and scope of the invention.

The invention is claimed as follows:

1. A contact lens cleaning system comprising: container means for receiving a quantity of fluid and a contact lens therein; vibrator means for transmitting vibration to a predetermined portion of said container means; and fluid agitator means operatively associated with the interior of said container and including resilient means comprising said predetermined portion and locatable for contact with said vibrator means so as to further transmit vibration to said fluid, whereby said fluid will be agitated to produce fluid turbulance to promote effective cleansing of a lens; wherein said resilient means comprises a diaphragm disposed at a top portion of said container; wherein said agitator means further includes an agitating member of a resilient material and a shaft member interconnecting said diaphragm and said agitating member; wherein said vibrator means includes vibration generating means, vibration transmitting means operatively associated with said vibration generating means and said predetermined portion of the container for transmitting vibrations to said container; and wherein said vibrator means and said container means include cooperating locating means for locating said container means for impingement by said vibration transmitting means on a portion of said diaphragm spaced apart from the portion thereof at which said shaft member is connected.

2. A system according to claim 1 wherein said container means includes a peripheral upper rim portion and a cap having a rim and a depending skirt, an edge portion of said diaphragm being sealingly engaged intermediate said cap rim and said container upper rim portion so as to generally define a resilient top closure portion of said container positioned to be contacted by said vibration transmitting means.

3. A system according to claim 1 wherein said diaphragm, said shaft member and said agitating member are integrally formed from a resilient material.

4. A system according to claim 1 wherein said agitating member and said diaphragm are generally circular and of similar convex curvatures, the convexity thereof generally facing said vibration transmitting member and being in the direction of a top portion of said container means.

5. A system according to claim 1 wherein said container means includes a top rim portion including a radially outwardly extending lip and wherein said resilient means includes a radially outer sealing portion integral with said diaphragm and including a downwardly depending skirt having a peripheral recess therein for complementary sealing engagement with said lip of said top rim portion of said container means.

6. A system according to claim 5 wherein said agitating member, said diaphragm, said shaft member and said resilient means sealing portion are integrally formed from a resilient material.

7. A system according to claim 1 wherein said container means is generally circular in cross-section having a predetermined inner diameter in the region of said agitating member and wherein said agitating member is circular and describes an effective diameter less than said predetermined inner diameter of said container means in the region of said agitating member.

8. A system according to claim 7 wherein said agitating member further includes a plurality of spaced apart radially outwardly extending fingers which describe an outer diameter substantially similar to the inner diameter of said container means in the region of said agitating member, whereby said outwardly extending fingers wipingly engage an inner wall surface of said container means during vibration of said agitating member.

9. A system according to claim 1 wherein said vibrator means includes vibration generating means, vibration transmitting means operatively associated with said vibration generating means and said predetermined portion of the container for transmitting vibrations to said container.

10. A system according to claim 9 wherein said vibrator means further includes a housing; and wherein said vibration generating means comprises alternating current-driven electromagnet means mounted in said housing to thereby generate an alternating magnetic field, yoke means pivotally mounted in said housing, and ferromagnetic means mounted to said yoke means and disposed in the alternating magnetic field of said electromagnet means to thereby cause oscillation of said yoke in response thereto; said vibration transmitting means being coupled with said yoke means at an end thereof generally opposite said pivotal mounting thereof.

11. A system according to claim 10 and further including pneumatic oscillation damping means mounted in said housing and coupled with said yoke for controlling said oscillation thereof.

12. A system according to claim 11 wherein said pneumatic oscillation damping means comprises a chamber having a control orifice and including resilient cap means coupled with said yoke.

13. A system according to claim 10 and further including a vibration damping mass mounted in said housing.

14. A system according to claim 10 wherein said vibration transmitting means comprises a protruding finger coupled to an end of said yoke opposite the pivotal mounting thereof and extending outwardly of said housing for contact with said resilient means.

15. A system according to claim 9 wherein said resilient means comprises a generally circular diaphragm disposed at a top portion of said container, and wherein said vibrator means further includes a platform portion for receiving said container means thereon, and further including locating means on said platform portion for locating said container means for impingement by said vibration transmitting means off-center on said generally circular diaphragm.

16. A system according to claim 15 wherein said vibrator means further includes a platform portion for receiving said container means thereon, and wherein said container means has a generally circular base and further including locating means on said platform portion comprising a raised circular rim for surroundingly engaging said circular base for locating said container for impingement of said diaphragm generally off-center by said protruding finger and wherein said protruding finger generally overhangs said platform and is offset from center with respect to said locating rim to thereby engage said diaphragm offset from the center thereof.

17. A lens case for use in a lens cleaning system comprising: container means for receiving a quantity of fluid and a contact lens therein; and agitator means for agitating the fluid in said container means and including resilient means coupled with said container means for transmitting externally generated vibrational forces for agitating said fluid in said container means; wherein said resilient means comprises a resilient diaphragm disposed at a top portion of said container means; and wherein said container means includes an annular upper rim portion and a cap having a generally annular rim and a depending skirt, an edge portion of said diaphragm being sealingly engaged intermediate said cap rim and said container means upper rim portion so as to generally define a resilient central top closure portion of said container means positionable to be contacted by external vibration transmitting means.

18. A vibrator assembly for use in a contact lens cleaning system comprising: a housing; alternating current-driven electromagnet means mounted in said housing to thereby generate an alternating magnetic field; yoke means pivotally mounted in said housing; ferromagnetic means mounted to said yoke means and disposed in the alternating magnetic field of said electromagnet means to thereby cause oscillation of said yoke in response to said alternating magnetic field; and vibration transmitting means coupled with said yoke means at an end thereof generally opposite said pivotal mounting thereof; and further including a platform portion and locating means on said platform portion for receiving and locating a container thereon for engagement by said vibration transmitting means.

19. A vibrator assembly according to claim 18 and further including pneumatic oscillation damping means mounted in said housing and associated with said yoke for controlling said oscillation thereof.

20. A contact lens cleaning system comprising: container means for receiving a quantity of fluid and a contact lens therein; vibrator means for transmitting vibration to a predetermined portion of said container means; and fluid agitator means operatively associated with the interior of said container and including resilient means comprising said predetermined portion and locatable for contact with said vibrator means so as to further transmit vibration to said fluid, whereby said fluid will be agitated to produce fluid turbulence to promote effective cleansing of a lens; wherein said resilient means comprises a diaphragm disposed at a top portion of said container; and wherein said container means includes a peripheral upper rim portion and a cap having a rim and a depending skirt, an edge portion of said diaphragm being sealingly engaged intermediate said cap rim and said container upper rim portion so as to generally define a resilient top closure portion of said container positioned to be contacted by said vibration transmitting means.

21. A contact lens cleaning system comprising: container means for receiving a quantity of fluid and a contact lens therein; vibrator means for transmitting vibration to a predetermined portion of said container means; and fluid agitator means operatively associated with the interior of said container and including resilient means comprising said predetermined portion and locatable for contact with said vibrator means so as to further transmit vibration to said fluid, whereby said fluid will be agitated to produce fluid turbulence to promote effective cleansing of a lens; wherein said resilient means comprises a diaphragm disposed at a top portion of said container; wherein said agitator means further includes an agitating member of a resilient material and a shaft member interconnecting said diaphragm and said agitating member; and wherein said diaphragm, said shaft member and said agitating member are integrally formed from a resilient material.

22. A contact lens cleaning system comprising: container means for receiving a quantity of fluid and a contact lens therein; vibrator means for transmitting vibration to a predetermined portion of said container means; and fluid agitator means operatively associated with the interior of said container and including resilient means comprising said predetermined portion and locatable for contact with said vibrator means so as to further transmit vibration to said fluid, whereby said fluid will be agitated to produce fluid turbulence to promote effective cleansing of a lens; wherein said resilient means comprises a diaphragm disposed at a top portion of said container; wherein said agitator means further includes an agitating member of a resilient material and a shaft member interconnecting said diaphragm and said agitating member; and wherein said agitating member and said diaphragm are generally circular and of similar convex curvatures, the convexity thereof generally facing said vibration transmitting member and being in the direction of a top portion of said container means.

23. A contact lens cleaning system comprising: container means for receiving a quantity of fluid and a contact lens therein; vibrator means for transmitting vibration to a predetermined portion of said container means; and fluid agitator means operatively associated with the interior of said container and including resilient means comprising said predetermined portion and locatable for contact with said vibrator means so as to further transmit vibration to said fluid, whereby said fluid will be agitated to produce fluid turbulence to promote effective cleansing of a lens; wherein said resilient means comprises a diaphragm disposed at a top portion of said container; wherein said agitator means further includes an agitating member of a resilient material and a shaft member interconnecting said diaphragm and said agitating member; and wherein said container means includes a top rim portion including a radially outwardly extending lip and wherein said resilient means includes a radially outer sealing portion integral with said diaphragm and including a downwardly depending skirt having a peripheral recess therein for complementary sealing engagement with said lip of said top rim portion of said container means.

24. A contact lens cleaning system comprising: container means for receiving a quantity of fluid and a contact lens therein; vibrator means for transmitting vibration to a predetermined portion of said container means; and fluid agitator means operatively associated with the interior of said container and including resilient means comprising said predetermined portion and locatable for contact with said vibrator means so as to further transmit vibration to said fluid, whereby said fluid will be agitated to produce fluid turbulence to promote effective cleansing of a lens; wherein said resilient means comprises a diaphragm disposed at a top portion of said container; wherein said agitator means further includes an agitating member of a resilient material and a shaft member interconnecting said diaphragm and said agitating member; wherein said container means is generally circular in cross-section having a predetermined inner diameter in the region of said agitating member and wherein said agitating member is circular and describes an effective diameter less than said predetermined inner diameter of said container means in the region of said agitating member; and wherein said agitating member further includes a plurality of spaced apart radially outwardly extending fingers which describe an outer diameter substantially similar to the inner diameter of said container means in the region of said agitating member, whereby said outwardly extending fingers wipingly engage an inner wall surface of said container means during vibration of said agitating member.

25. A contact lens cleaning system comprising: container means for receiving a quantity of fluid and a contact lens therein; vibrator means for transmitting vibration to a predetermined portion of said container means; and fluid agitator means operatively associated with the interior of said container and including resilient means comprising said predetermined portion and locatable for contact with said vibrator means so as to further transmit vibration to said fluid, whereby said fluid will be agitated to produce fluid turbulence to promote effective cleansing of a lens; wherein said vibrator means includes vibration generating means, vibration transmitting means operatively associated with said vibration generating means and said predetermined portion of the container for transmitting vibrations to said container; wherein said vibrator means further includes a housing; and wherein said vibration generating means comprises alternating current-driven electromagnet means mounted in said housing to thereby generate an alternating magnetic field, yoke means pivotally mounted in said housing, and ferromagnetic means mounted to said yoke means and disposed in the alternating magnetic field of said electromagnet means to thereby cause oscillation of said yoke in response thereto; said vibration transmitting means being coupled with said yoke means at an end thereof generally opposite said pivotal mounting thereof.

26. A contact lens cleaning system comprising: container means for receiving a quantity of fluid and a contact lens therein; vibrator means for transmitting vibration to a predetermined portion of said container means; and fluid agitator means operatively associated with the interior of said container and including resilient means comprising said predetermined portion and locatable for contact with said vibrator means so as to further transmit vibration to said fluid, whereby said fluid will be agitated to produce fluid turbulence to promote effective cleansing of a lens; wherein said resilient means comprises a generally circular diaphragm disposed at a top portion of said container; wherein said vibrator means includes vibration generating means, vibration transmitting means operatively associated with said vibration generating means and said predetermined portion of the container for transmitting vibrations to said container; and wherein said vibrator means further includes a platform portion for receiving said container means thereon; and further including locating means on said platform portion for locating said container means for impingement by said vibration transmitting means off-center on said generally circular diaphragm.

27. A lens case for use in a lens cleaning system comprising: container means for receiving a quantity of fluid and a contact lens therein; and agitator means for agitating the fluid in said container means and including resilient means coupled with said container means for transmitting externally generated vibrational forces for agitating said fluid in said container means; wherein said resilient means comprises a resilient diaphragm disposed at a top portion of said container means; wherein said agitator means further includes an agitating member of a resilient material and a shaft member interconnecting said diaphragm and said agitating member; and wherein said diaphragm, said shaft member and said agitating member are integrally formed from a resilient material.

* * * * *